DROP BACK SELECTOR CIRCUIT

Filed May 12, 1954 5 Sheets-Sheet 1

INVENTOR.
WILLIAM W. PHARIS
BY T. L. Bowes
ATTORNEY

DROP BACK SELECTOR CIRCUIT

Filed May 12, 1954 5 Sheets-Sheet 2

DROP BACK SELECTOR CIRCUIT

Sept. 30, 1958 W. W. PHARIS 2,854,515

DROP BACK SELECTOR CIRCUIT

Filed May 12, 1954 5 Sheets-Sheet 4

United States Patent Office 2,854,515

Patented Sept. 30, 1958

2,854,515

DROP BACK SELECTOR CIRCUIT

William W. Pharis, Rochester, N. Y., assignor, by mesne assignments, to General Dynamics Corporation, a corporation of Delaware Application May 12, 1954, Serial No. 429,169

6 Claims. (Cl. 179—18)

This invention relates to automatic telephone systems and more particularly to drop back selector circuits for use in such systems.

It is an object of my invention to provide a selector having utility in universal interoffice numbering plans which enables the use of the normal level of a flat-type, two-motion switch such as sold by my assignee under the trade-mark "XY."

The features of my invention which I believe to be novel are set forth with particularity in the appended claims. My invention itself, both as to its organization and manner of operation, together with further objects and advantages thereof, may best be understood by reference to the following description taken in connection with the accompanying drawings, in which:

Figure 1:
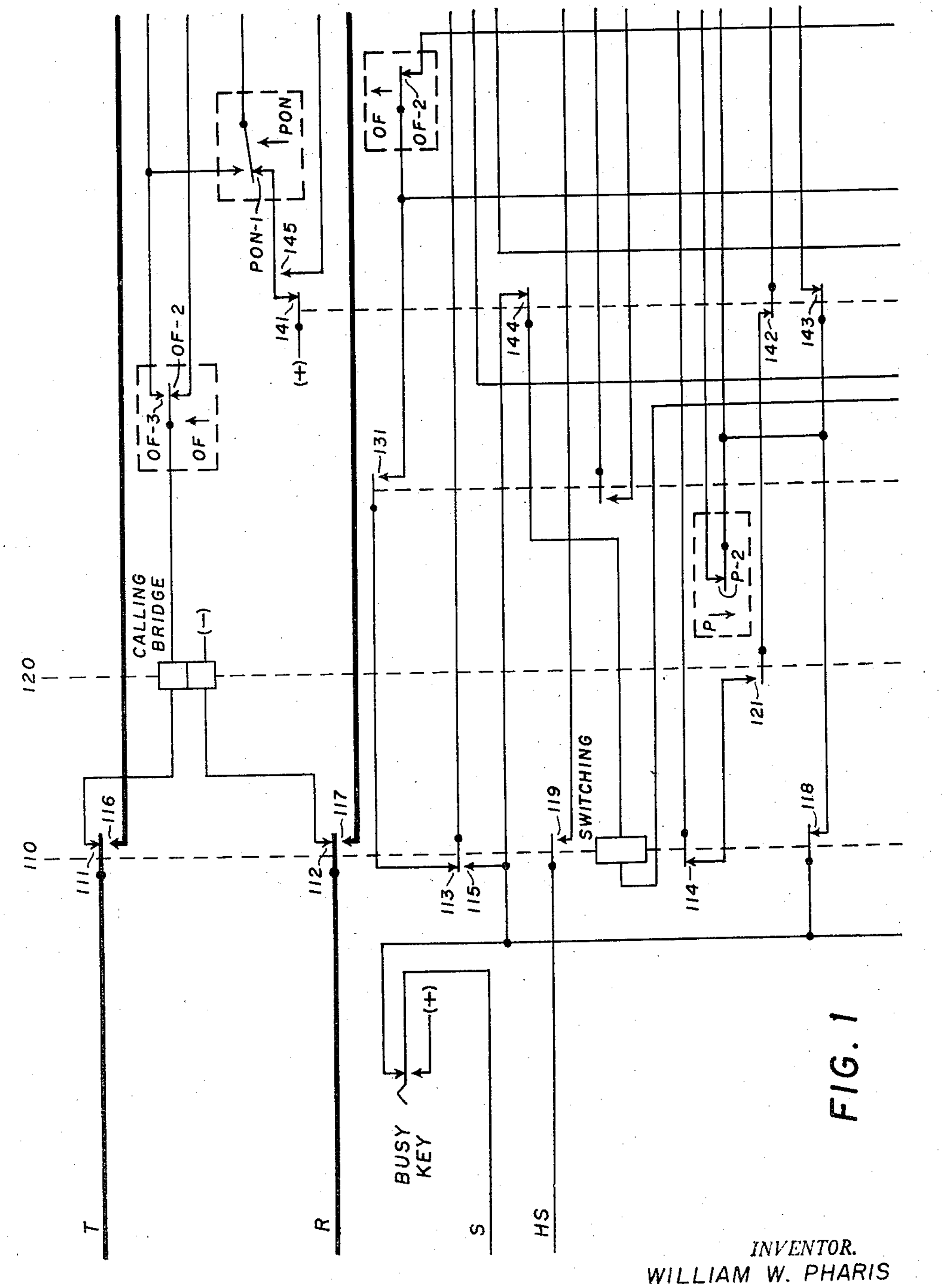
Figs. 1 to 4 illustrate a selector embodying the principles of my invention.
Figure 2:
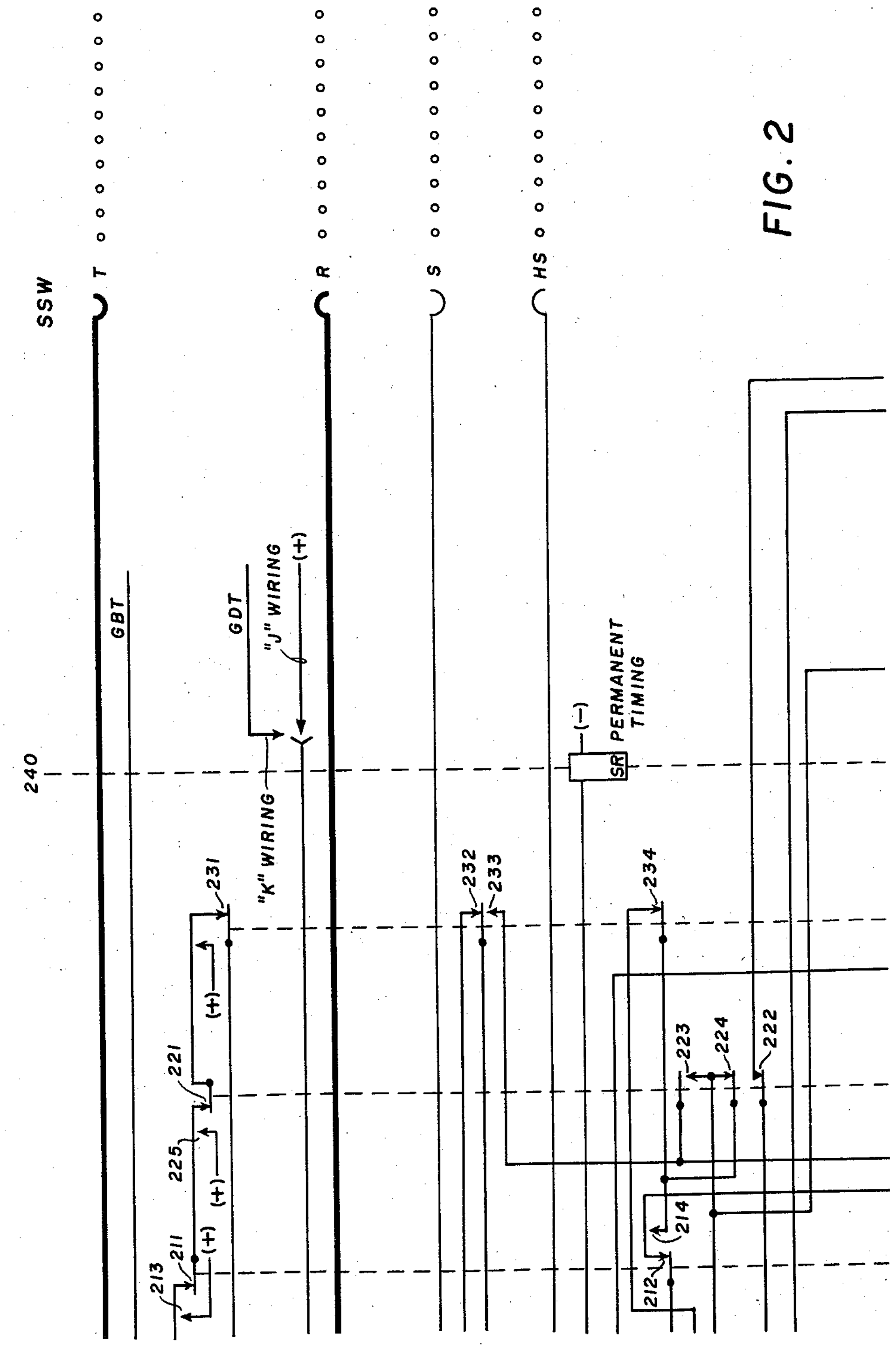
Figure 3:
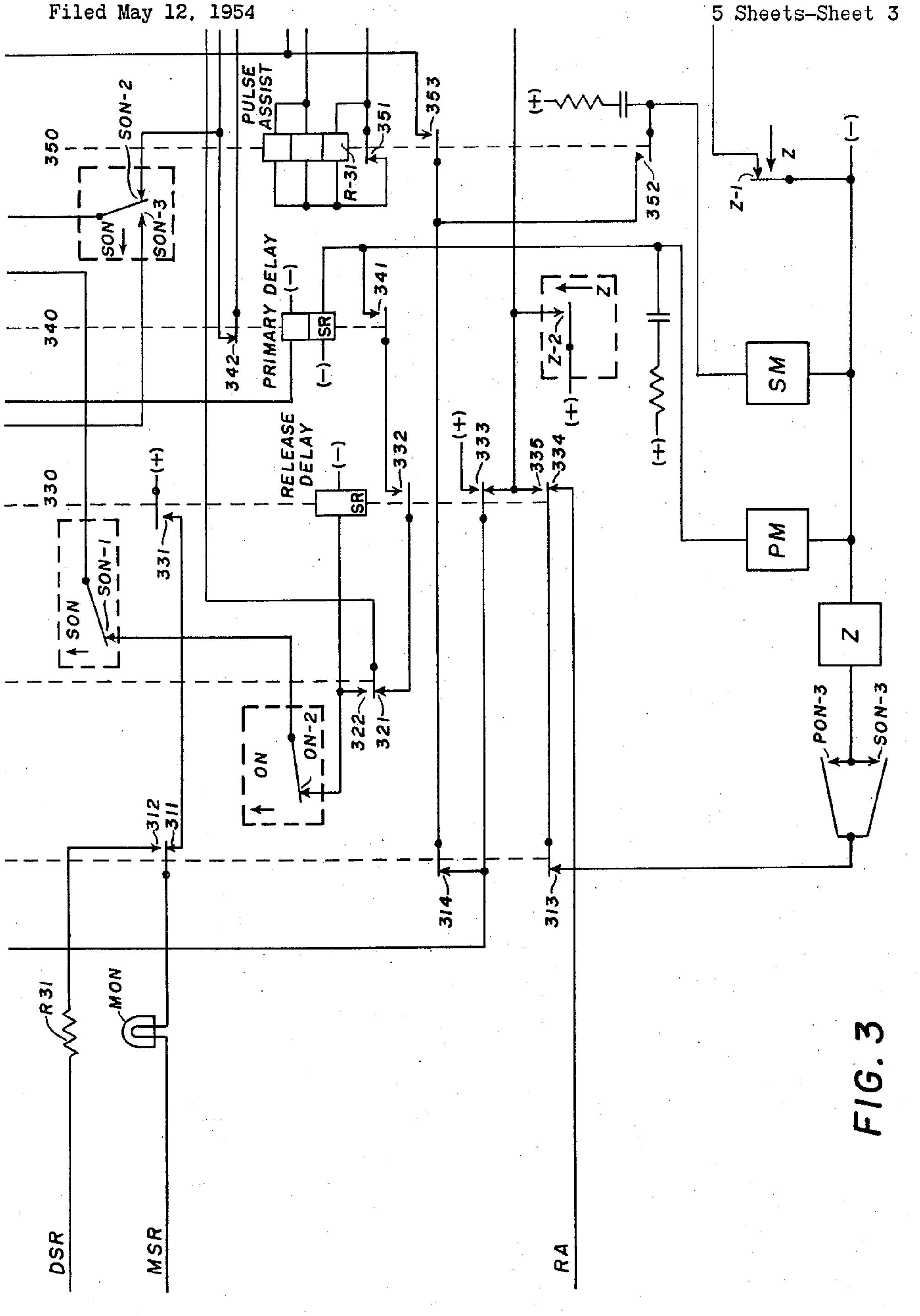
Figures 4, 5:
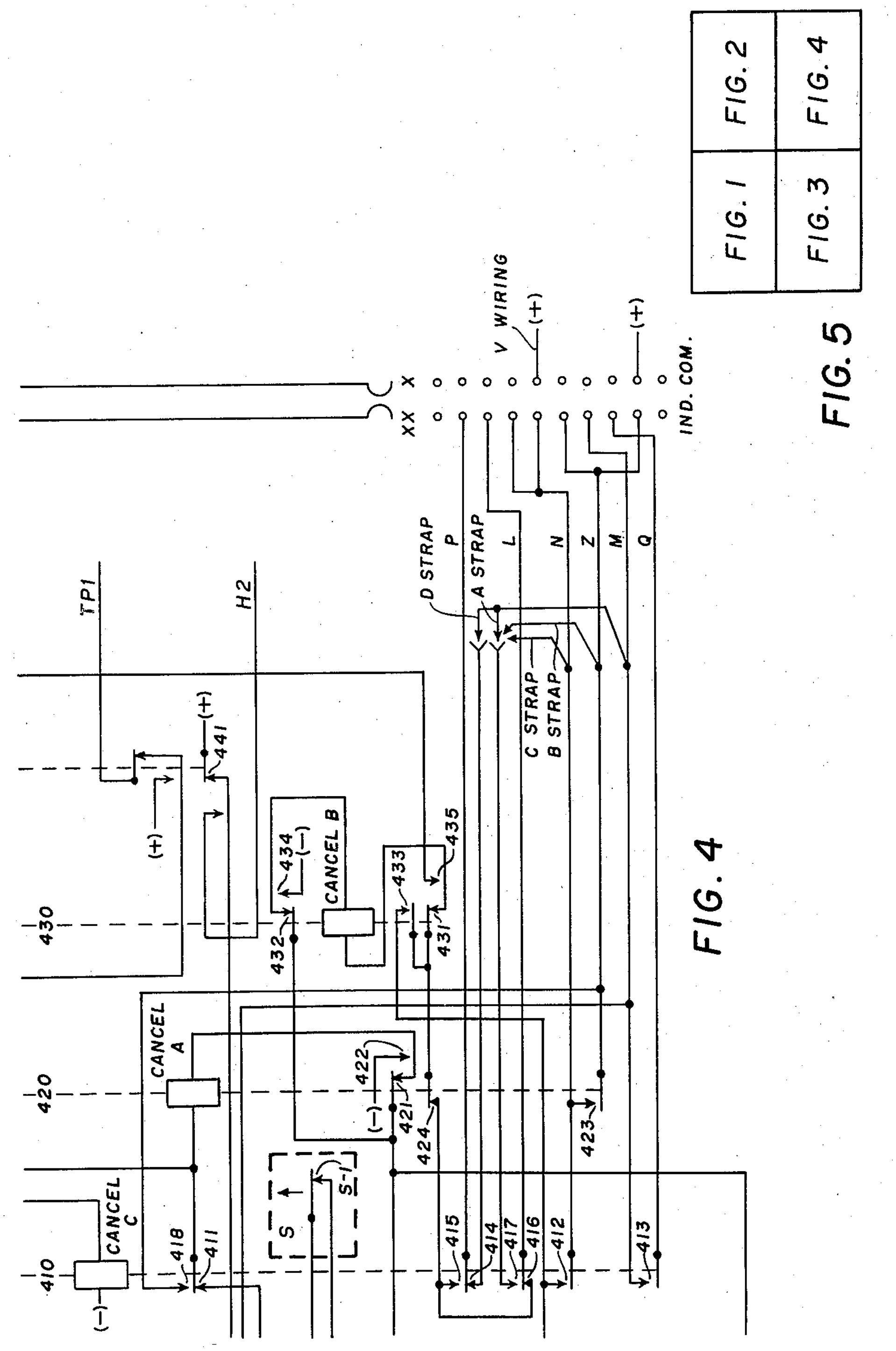
Fig. 5 is a chart showing the relationships of Figs. 1 to 4 with each other.
Figure 6:
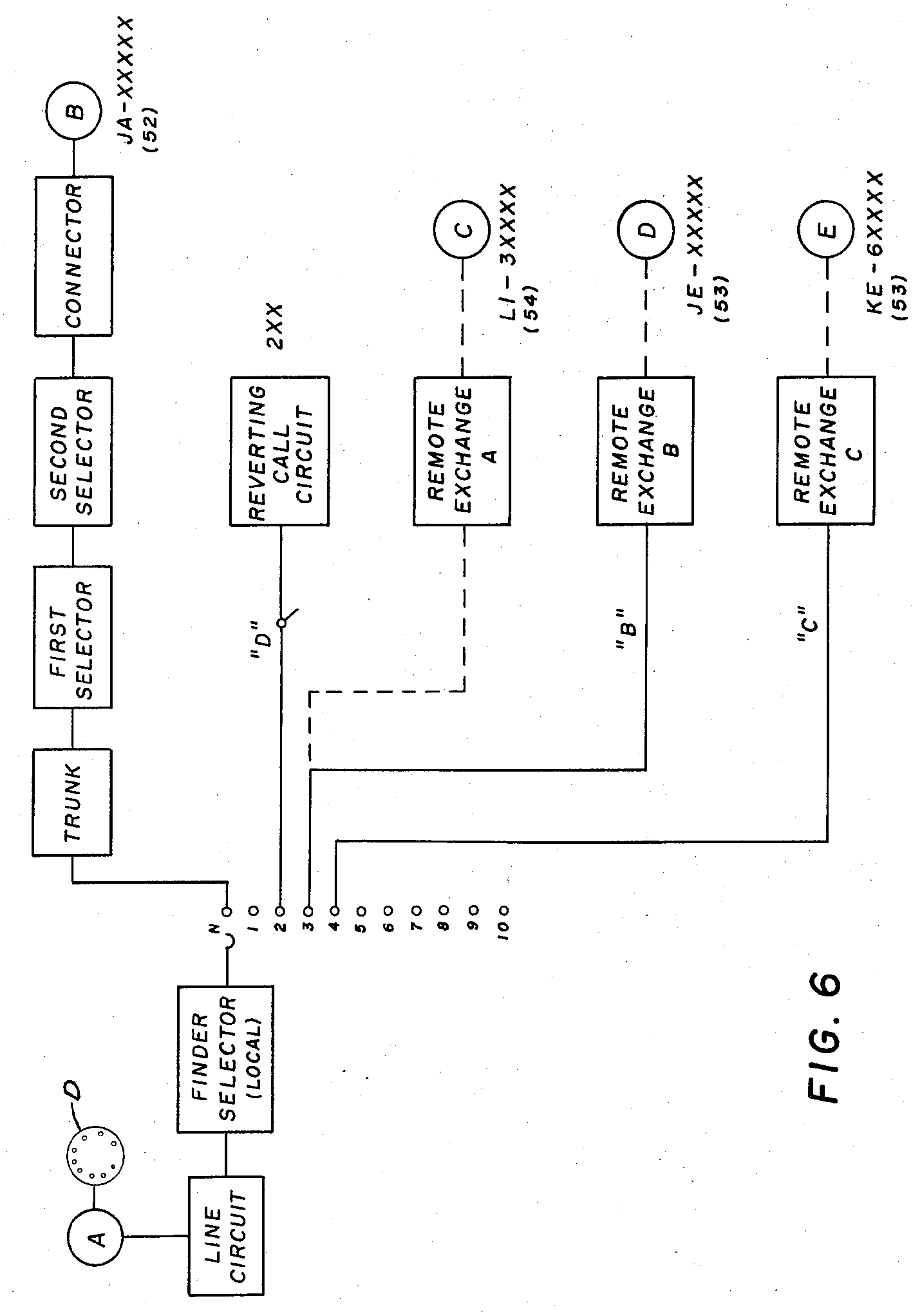
Fig. 6 is a block diagram showing a hypothetical system embodying the principles of my invention.

Referring to Figs. 2 and 4 of the drawings, there is depicted the representation of a step-by-step switch SSW having a first set of switch brushes designated by the letters T, R, S, and HS. This first set of brushes is arranged for both primary and secondary directions of movement. In Fig. 4 there is shown a pair of auxiliary brushes designated by the letters X and XX arranged to engage contacts in auxiliary banks of contacts. The X and XX brushes are arranged to move successively into engagement with the contacts in the X and XX banks during the primary movement of the primary set of brushes. Various connections to the contacts in the X and XX banks are indicated by various reference letters. As the following description proceeds the significance of the various letters will become apparent.

A contact level is said to be a digit canceling level if the selector switch SSW releases and the selector circuit restores to the same condition it was in before the level was dialed. Thus a selector switch cannot hunt through the contacts of a digit canceling level until some other particular level has been dialed to alter the circuit conditions. A level is said to be a digit adding level if the circuits are so arranged that the switch, after being dialed to that particular level, restores to normal and in so doing alters the circuit in such a manner that the same level may be dialed immediately and normal searching therein and switch through may take place.

Referring to Fig. 4, when the switch is stepped to a level marked by "N" wiring in the XX bank and "V" wiring in the X bank before any other levels have been dialed, the switch restores or returns to its normal position and during this operation the selector circuits are so altered that this level, i. e., the fifth level, is later available for use. Reviewing the above definition of a digit adding level, it is noted that any level marked by "N" and "V" wiring is a digit adding level and if digit 5 representing the fifth level is a first digit to be dialed, this level becomes the first digit adding level. If the same level, i. e., the fifth level, is now dialed again without release of the circuit or without having dialed certain other levels, the level will be a digit canceling level and another predetermined digit or "unblocking" digit will be required. If the fifth level, or for that matter any other level marked with the "N" wiring is dialed after the unblocking digit has been dialed, the level is used and the selector switches through to the succeeding equipment on the first step or contact found idle.

If the switch is stepped to a level marked by "Z" wiring in the XX contact bank, as for example the sixth level in Fig. 4, before any other levels have been dialed, busy tone is returned to the subscriber but if the switch is stepped to a "Z" wiring level after the first digit adding level has been dialed, i. e., the level marked by "N" and "V" wiring, the switch releases and the circuits are altered in such a way that any level dialed next causes the selector switch to hunt and switch through in that level. Thus the "Z" level constitutes a second digit adding level.

If the switch is stepped to a level marked by "Z" and "V" wiring, as represented by the ninth level in Fig. 4, before any other levels have been dialed, the switch restores to normal and the selector circuits are so altered that any level dialed thereafter will be used. This operation may be termed single digit adding. If the "Z" and "V" wiring level is dialed after the first digit adding level, i. e., "N" and "V" wiring, the switch restores and alters the circuits so that any level dialed thereafter is used.

There follows a detailed description of the sequence of operations which takes place in the selector circuit of Figs. 1 to 4, inclusive, when the selector is seized by preceding equipment.

When the circuit illustrated herein is seized the incoming loop is closed for operating calling bridge relay 120 from battery through the lower winding of relay 120, normal contacts 112, ring lead R, calling loop (not shown) across leads T and R, tip lead T, normal contacts 111, upper winding of relay 120, normal overflow contacts OF2, normal contacts 211, 221 and 231, primary off-normal contacts PON–1 and normal contacts 141 to ground. In this specification conventional telephone practice is followed wherein the positive terminal of the station battery is connected to ground and is hereinafter referred to as "ground" and is indicated by the symbol (+). The negative terminal of the station battery is referred to hereinafter as "battery" and is indicated by the symbol (—).

In response to the operation of the calling bridge relay 120, a circuit is completed for connecting a first canceling relay 410 to the X wiper or brush of the auxiliary brush set over a circuit extending from battery through the winding of cancel C relay 410, normal contacts 212 and 114, operated contacts 121 of the calling bridge relay 120 and normal contacts 142 and 222; another circuit is completed for operating release delay relay 330 and primary delay relay 340 in parallel over a circuit extending from ground at normal contacts 441 through operated contacts 322 of calling bridge relay 120 and the winding of release delay relay 330 to battery in one branch and by way of primary direction off-normal contacts PON–2, secondary direction off-normal contacts SON–1, normal contacts 232, and the upper winding of primary delay relay 340 to battery.

In response to the operation of relay 330 over the foregoing circuit, ground is applied to lead MSR by way of operated contacts 331 and normal contacts 311; part of the pulsing path for the primary magnet PM is prepared at contacts 332; ground is applied to the back sleeve lead S at operated contacts 333 in order to mark the selector circuit busy to other incoming calls; and the lead RA is opened at normal contacts 334.

In response to the simultaneous operation of primary delay relay 340, the impulsing path to primary direction magnet PM is completed at contacts 341; the lead extending to the wiper XX is opened at contacts 143; cancel C relay 410 is disconnected from the wiper X at contacts 142; a path to switching relay 110 is opened at contacts 144; a circuit is completed for applying grounded dial tone on lead GDT by way of the "K" wiring, or direct ground by way of the "J" wiring, in order to hold operated the calling bridge relay 120 over a circuit through operated contacts 145 and the previously described circuit through the upper winding of relay 120.

The selector circuit is now in condition to receive digits comprising predetermined numbers of impulses which may be transmitted by suitable impulse transmitting means such, for example, as a conventional dial D, shown symbolically at substation A.

Upon receipt of the first impulse, the calling loop is opened to release calling bridge relay 120. The restoration of relay 120 closes a circuit to the lower winding of primary delay relay 340, the circuit extending from battery through the lower winding, operated contacts 341 and 332, the pulsing contacts 321 of calling bridge relay 120, and normal contacts 441 to ground. This pulsing circuit is also connected to primary pulsing relay PM in parallel with the lower winding of relay 340. The restoration of relay 120 also opens the energizing circuit for relay 330 at contacts 322, but this relay is made slow-to-release in order that it will hold operated during pulsing.

In response to the completion of the pulsing circuit to magnet PM, the selector switch SSW moves one step in the primary direction, i. e., moves one step away from its normal position opposite the normal level to a second position corresponding to a first off-normal level. At this time the primary off-normal springs designated by the letters PON open. Hence at this time the energizing circuit for relay 340 is broken at off-normal contacts PON–2 but this relay is also made slow-to-release and holds operated during pulsing of calling bridge relay 120 through its lower winding and the pulsing circuit.

Upon completion of the first impulse, the calling loop is reclosed to reoperate calling bridge relay 120 and the energizing circuit for relay 330 is reclosed and the circuit through the lower winding of primary delay relay 340 is opened at pulsing contacts 321. The opening of the pulsing contacts 321 also de-energizes the primary stepping magnet PM.

The calling bridge relay continues to follow the dial pulses to step the step-by-step switch to the desired off-normal level in accordance with the number of pulses dialed and received in the selector circuit. Upon the completion of the last impulse of each digit, primary delay relay 340 releases after a time determined by its release characteristics since the circuit through its lower winding is opened at contacts 321 and the circuit through its upper winding is opened at off-normal contacts PON–2.

Upon the restoration of primary delay relay 340, a point in the operating path for switching relay 110 is closed at contacts 144; ground is applied to wiper XX through normal contacts 143 and 118, and operated contacts 333; the cancel C relay 410 is reconnected to wiper X at normal contacts 142; and dial tone is removed from the line at contacts 145.

When no digit adding or canceling levels have been dialed, as for example the seventh level, means is provided for causing the switch to hunt in such a level for idle succeeding equipment. The XX contact corresponding to the seventh level is connected to "M" wiring. Thus ground appearing on the XX brush by way of contacts 143, 118, and 333 is extended to the middle winding of pulse assist relay 350 by way of brush XX, XX bank contact, "M" wiring, secondary off-normal contacts SON–2, overflow contacts OF–2, secondary interrupter contacts S–1, middle winding of relay 350, normal contacts 351 and release magnet contacts Z–1 to battery in order to operate the pulse assist relay.

In response to the operation of relay 350, a series resistor R–31, which may be the lower non-inductive winding of relay 350, is inserted in the energizing circuit for relay 350 when normal contacts 351 open; a circuit is closed for energizing the secondary stepping magnet SM at operated contacts 352; and pulse assist relay 350 locks itself operated through secondary interrupter contacts S–1, operated contacts 353, normal contacts 314, and operated contacts 333 to ground. Cancel A relay 420 operates in parallel with pulse assist relay 350 over a circuit from ground by way of the brush XX and "M" wiring, normal contacts 342 and 411, winding of relay 420, normal contacts 421 and Z–1 to battery.

The operation relay 420 closes a locking circuit to battery through operated contacts 422; connects the "N" wiring to the "Z" wiring through operated contacts 423; applies direct ground to the upper winding of calling bridge relay 120 through normal overflow contacts OF–2, normal contacts 211 and operated contacts 225; and opens the circuit to wiper X at contacts 222.

Upon the completion of the previously described energizing circuit for secondary stepping magnet SM, the magnet SM operates, thereby moving the switch SSW one step in the secondary direction. Operation of magnet SM opens the secondary interrupter contacts S–1 to effect the de-energization of relay 350 which restores, thereby shunting out the resistor R–31 and opening the path to magnet SM at contacts 353. Magnet SM restores.

If the succeeding circuit connected to the first set of wire bank terminals is busy, ground is returned over the sleeve brush S, normal contacts 113, operated contacts 131, overflow contacts OF–2, and secondary interrupter contacts S–1 to re-energize pulse assist relay 350. This same sleeve ground is also extended to the left-hand terminal of switching relay 110 by way of normal contacts 113, operated contacts 131 and secondary off-normal contacts SON–3, but since the right-hand terminal of switching relay 110 is also grounded through contacts 144 and 333, switching relay 110 is shunted down.

The alternate operations of relay 350 and stepping magnet SM continue until the sleeve brush of switch SSW encounters a contact in the sleeve bank marked by absence of ground or until the switch has been stepped to the overflow position. Assuming that an idle contact is found, the shunting ground is removed from the switching relay 110, whereupon the selector circuit is switched through to the succeeding equipment for the reason that pulse assist relay 350 does not re-operate in the absence of ground on wiper S and a circuit is completed through the winding of switching relay 110 in series with the winding of relay 350 to battery by way of release magnet contacts Z–1. The pulse assist relay 350 does not operate at this time because of insufficient current flow, but the switching relay 110 operates.

Various of the options represented by the wiring designations in Fig. 4 are next explained. In addition to the wiring designated by the reference letters in Fig. 4, there is also illustrated optional strapping as indicated by the reference letters A, B, C and D. The A, B and C straps are employed to connect the normally open contact portion of contacts 417 to wiring "M," "Z" and "N," respectively, and the D strap is employed to connect the normal contact portion of contacts 414 to the "M" wiring.

It will be recalled that when the selector switch SSW has been stepped in the primary direction, the primary delay relay 340 releases at the end of the train of dial pulses and ground is then extended to wiper XX by way of operated contacts 333, normal contacts 115, and normal contacts 143.

*Options involving strap D*

My invention relates to circuit arrangements utilizing the "D" strap.

First, let it be assumed that the first digit dialed into the selector causes brush XX to move to a level marked by "P" wiring in the XX bank. In the illustrated form of my invention the second level is so marked. Therefore, upon the receipt of the digit "2" from the inpulse transmitter at the calling station, switch SSW moves to a position opposite the second off-normal level in the switch banks and brush XX is moved into engagement with the second contact in the XX bank. When the primary delay relay 340 releases after the completion of the pulses representing digit "2," ground on the XX brush is utilized to operate cancel relay A 420 over a circuit extending from ground on the "P" wiring, through normal contacts 414, D strap, normal contacts 342 and 411, winding of relay 420, normal contacts 421, and release magnet interrupter contacts Z–1 to battery.

Upon release the primary delay relay 340 makes the switch operative to advance within the one of the levels opposed by the brushes by completing an operating circuit to the hunt assist relay 350 whereby switch SSW hunts in the first off-normal level without drop-back (seconnd level). Thus hunt assist relay 350 operates over a circuit from battery through normal contacts Z–1 and 351, middle winding of relay 350, normal contacts S–1 and OF–2, normal contacts SON–2, D strap, normal contacts 414, P wiring, XX bank and wiper, normal contacts 143 and 118, and operated contacts 333 to ground. Secondary magnet SM is energized in response to the operation of relay 350 and hence switch SSW moves in the secondary direction through the interaction of pulse assist relay 350 and secondary stepping magnet SM in the manner previously described until the first free terminal is encountered, at which time the selector circuit is switched through to the succeeding circuit.

It is now assumed that it is desired to permit hunting in the normal level of switch SSW, i. e., in the contacts of the terminal bank opposite the normal or restored position of the brushes T, R, S and HS. For this purpose the circuit is arranged to utilize a digit adding level for the first digit, such as represented by the combination of "N" and "V" wiring in Fig. 4. In the arrangement shown in Fig. 4 this is accomplished by dialing the digit "5." When primary delay relay 340 releases a short time after the receipt of the last pulse in the digit, first control means including cancel C relay 410 operates from ground on the "V" wiring by way of brush X, normal contacts 222 and 142, operated contacts 121, normal contacts 114 and 212, and winding of relay 410 to battery.

In response to the operation of relay 410, relay 410 locks operated through operated contacts 214, normal contacts 234, primary interrupter contacts P–2, normal contacts 118 and operated contacts 333 to ground; applies ground to the upper winding of calling bridge relay 120 by way of operated contacts 213 and normal overflow contacts OF–2; and extends ground on wiper XX by way of the "N" wiring, operated contacts 412, operated contacts 335, normal contacts 313, primary off-normal contacts PON–3, and the release magnet Z to battery, whereupon the release magnet operates to restore switch SSW. The operation of release magnet Z closes an alternate source of ground for the magnet Z from operated contacts Z–2 through operated contacts 335 and normal contacts 313.

In response to the restoration of switch SSW, primary delay relay 340 reoperates through its upper winding, normal contacts 232, secondary off-normal contacts SON–1, primary off-normal contacts PON–2, operated contacts 322, and normal contacts 441 to ground, thereby opening the circuits to both brushes XX and X at contacts 143 and 143, respectively.

Relay 410 remains operated at this time through the previously described locking circuit and under this condition dial tone cannot be applied to the calling line because the dial tone circuit is open at contacts 211.

Assuming that the second digit received in the selector advances the switch to a level marked by "P" wiring, i. e., the second level in Fig. 4, in the same manner as previously described, primary delay relay 340 releases a short time after the completion of the digit and a circuit is thereupon completed for operating second control means including cancel B relay 430 from ground on brush XX by way of the "P" wiring, operated contacts 415, normal contacts 424 and 431, winding of relay 430, normal contacts 432, and release magnet contacts Z–1 to battery.

In response to the operation of cancel B relay 430, circuits are completed for locking operated relay 430 from battery through operated contacts 434, winding of relay 430, operated contacts 435, normal contacts 118 and operated contacts 333 to ground; connecting the release magnet Z to ground on brush XX by way of "P" wiring, operated contacts 415, normal contacts 424, operated contacts 433, and 335, normal contacts 313, primary off-normal contacts PON-3 and the release magnet Z to battery; and opening a parallel holding circuit for cancel C relay 410 at contacts 234.

Responsive to the restoration of switch SSW, the primary off-normal contacts PON–1 complete a circuit to the cancel A relay 420. This circuit may be traced from battery through normal contacts Z–1 and 421, cancel A relay winding, operated contacts 233, secondary off-normal contacts SON–1, primary off-normal contacts PON–1, operated contacts 322 and normal contacts 441 to ground. The operation of relay 420 opens the holding circuit to relay 410 at operated contacts 234. The release of cancel C relay 410 completes a circuit for causing switch SSW to hunt in the normal level, this circuit extending from battery through release magnet contacts Z–1, normal contacts 351, middle winding of pulse assist relay 350, secondary interrupter contacts S–1, overflow contacts OF–2, secondary normal contacts SON–2, strap D, and normal contacts 414 to the "P" wiring and ground on brush XX. Pulse assist relay 350 operates over this circuit as previously described and there follows the previously described cooperation between pulse assist relay 350 and the secondary magnet SM. Switch SSW advances into the normal level until an unused set of terminals or contacts is encountered.

Summarizing options available through the use of the D strap, hunting may be had directly in a second particular level marked by "P" wiring without drop-back, as by using the digit "2" as the first digit dialed into the selector and normal level hunting may be had by dialing a first particular digit adding level (marked by "N" and "V" wiring) and by thereafter dialing a level marked by "P" wiring as the first and second digits dialed into the selector.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a selector having a normal bank contact level and a plurality of off-normal bank contact levels including a first and a second particular level; a set of brushes normally positioned opposite the contacts of said normal level; impulse transmitting means; means for transmitting to said selector a plurality of digits from said transmitter, each of said digits comprising one or more impulses; means responsive to the receipt of a digit for selectively advancing said brushes to one of said off-normal levels; first control means responsive to the positioning of said brushes at said first level for restoring said brushes to their normal positions; said advancing means being responsive thereafter to the receipt of a second predetermined digit for advancing said brushes to said second level; second control means responsive to the positioning of said brushes at said second level and to the operation of said first control means for restoring said brushes to their normal positions; and secondary advancing means responsive to restoration of said brushes to their normal positions and to the operation of said second control means for advancing said brushes into engagement with the contacts of the one of said levels opposed by said brushes, whereby said brushes may be advanced within said normal level.

2. In a selector having a normal bank contact level and a plurality of off-normal bank contact levels including a first and a second particular level; a set of brushes normally positioned opposite the contacts of said normal level; impulse transmitting means; means for transmitting to said selector a plurality of digits from said transmitter, each of said digits comprising one or more impulses; means responsive to the receipt of a digit for selectively advancing said brushes to one of said off-normal levels; a relay; means responsive to the positioning of said brushes at said first level and the termination of transmission of a digit for operating said relay; means responsive to the operation of said relay for restoring said brushes to their normal positions; said advancing means being responsive thereafter to the receipt of a second digit for advancing said brushes to said second level; control means responsive to the positioning of said brushes at said second level and to the operation of said relay for restoring said brushes to the their normal positions; and secondary advancing means responsive to restoration of said brushes and to the operation of said control means for advancing said brushes into engagement with the contacts of the one of said levels opposed by said brushes, whereby said brushes may be advanced within said normal level.

3. In a selector having a normal bank contact level and a plurality of off-normal bank contact levels including a first and a second particular level; a set of brushes normally positioned opposite the contacts of said normal level; impulse transmitting means; means for transmitting to said selector a plurality of digits from said transmitter, each of said digits comprising one or more impulses; means responsive to the receipt of a digit for selectively advancing said brushes to any of said off-normal levels; a first relay; means responsive to the positioning of said brushes at said first level and the termination transmission of a digit for operating said relay; means responsive to the operation of said relay for restoring said brushes to their normal positions; said advancing means being responsive thereafter to the receipt of a second digit for advancing said brushes to said second off-normal level; a second relay; means responsive to the positioning of said brushes at said second level and the termination of said second digit for operating said second relay; means responsive to the operation of said second relay for again restoring said brushes to their normal positions and for releasing said first relay; and means responsive to the restoration of said brushes and the release of said first relay for causing said brushes to advance into said normal level.

4. The selector set forth in claim 1 wherein said second control means is also effective upon the selection of said second level at the end of transmission of a first digit to said selector for operating said secondary advancing means, whereby said brushes may be advanced within said second level.

5. The selector set forth in claim 2 wherein said second control means is also effective upon the selection of said second level at the end of transmission of a first digit to said selector for operating said secondary advancing means, whereby said brushes may be advanced within said second level.

6. The selector set forth in claim 3 and having an adtion means operative in response to the positioning of said brushes at said second level and to the normal condition of said first relay for making said secondary advancing means operative, whereby said brushes may be advanced within said second level.

References Cited in the file of this patent

UNITED STATES PATENTS

| | | |
|---|---|---|
| 1,626,103 | Simmons | Apr. 26, 1927 |
| 1,747,478 | Lomax | Feb. 18, 1930 |
| 1,883,680 | Friendly | Oct. 18, 1932 |
| 2,513,400 | Carson et al. | July 4, 1950 |
| 2,642,498 | Riddell et al. | June 16, 1953 |
| 2,658,949 | Pharis | Nov. 10, 1953 |